United States Patent Office

3,470,278
    Patented Sept. 30, 1969

---

3,470,278
METHOD OF PIGMENTING VINYL FILMS AND PREPARATIONS FOR PIGMENTING THE SAME
William H. A. Weber, Jr., Maplewood, N.J., assignor to Samuel M. Schwartz, Paterson, N.J.
No Drawing. Filed Apr. 25, 1967, Ser. No. 633,425
Int. Cl. B29d *27/00;* C08f *47/10*
U.S. Cl. 264—54                                6 Claims

ABSTRACT OF THE DISCLOSURE

Vinyl films are colored without streaking, fading or clumping effects by the use of foam vinyl chloride plastic encapsulated pigments. The encapsulated pigments are distributed throughout the body of the film and each carries a layer of a foam or porous vinyl chloride polymer which has a lubricating material therein of the nature of castor oil. The foam or porous vinyl chloride polymer is treated by heat and pressure in such a manner as to release any loosely bound chlorine and render the remaining chlorine inactive as far as changing the coloration of the pigment is concerned.

DESCRIPTION OF PRIOR ART

In the prior art it was found that with vinyl chloride polymers there was streaking and deterioration of the color apparently due to the freeing and availability of chlorine ions which cause discoloration of the pigments, particularly inorganic pigments.

In British Patent 781,161 the polymers and copolymers of vinyl chloride cause combinations and deterioration of the pigments or dyes which are utilized with the result that off shades are produced and undesirable color effects result. This patent depends upon the use of copolymers which are less polymerized than the material which is to be colored.

It has now been found that the desirable feature is to utilize an encapsulating vinyl polymer having a higher degree of polymerization than the film to be colored and with such prolonged treatment that all loosely bound chlorine will be eliminated and any residual chlorine in the polymer will not affect the color value.

In British Patent No. 781,161 vinyl copolymer is mixed with a red dyestuff for ten minutes from 80 to 90° C. The highest temperature mentioned is 110 to 120° C. with 40% of a plasticizer such as dioctyl phthalate.

According to the Deutsch Patent 2,816,044, a plastic composition having a pearlescent surface is produced. There is no disclosure of a vinyl material nor is there any disclosure of using two rollers. The patent is primarily directed to an injection molding process in which the sheets of material are obtained after milling on a mason cutter. There is no disclosure of finely divided pigments nor of vinyl materials to which the present application is limited.

In respect to Kirby Patent 3,004,986, this patent merely describes pigments of copper phthalocyanine and hexadecachloro copper phthalocyanine. The pigments are obtained in the form of a pressed cake and are not prepared for usage by incorporation of small quantities of resins. Actually it merely discloses that the pigments may be used with plastics and toners.

SUMMARY OF INVENTION

The present invention relates to the coloring of vinyl plastic films by use of vinyl chloride polymers desirably having a greater molecular weight than the film which encapsulate particles of the pigment. The present invention further relates to chlorinated vinyl polymer pigment mixtures and it particularly relates to pigment resin mixtures wherein the pigments are subject to discoloration and loss in color value due to reaction between the chlorine degradation and the pigment.

It is among the objects of the present invention to provide a novel pigmented vinyl chloride resin mixture which may be utilized for adding pigment to plastic sheeting and molding compositions and in other connections where pigments should be added in controlled amounts and without loss of color value.

In connection with many types of pigments the discoloration and loss of shade will often vary depending upon conditions of atmospheric conditions or the temperatures or character of the calenders or the molding machine, and it is very hard to obtain uniform coloration or pigmentation from batch to batch.

The pigment material is combined in finely divided form with vinyl chloride polymer so that a uniform premixture is obtained with the vinyl polymer thoroughly coating and covering the pigment particles.

It has been found for this purpose that the most desirable polymers are thermoplastic vinyl chloride copolymers having a molecular weight of 5,000 to 50,000 which can be rolled or kneaded with the pigment material.

It has been found most desirable to combine the vinyl chloride polymer in minor proportion with a major portion of the pigment and with said pigment being powdered to a mesh size of 40 to 100.

Although the pigment ratio in some cases may vary from 20 to 80 parts of the pigment to 80 to 20 parts of the resin, it has been found preferable to form a mixture which contains about 50 to 80 parts (preferably 2 parts by weight) of pigment for each 50 to 20 (1 part by weight) parts of polymer so that the pigment will take up from 50 to 80% of the finer mixture.

Desirably, the combination is caused between the pigment and the resin at a pressure of about 2000 to 6000 pounds per square inch and at a temperature of 180° to 200° F. and desirably upon a roller mill with a hot roll and a cold roll.

The mixture to be complete should gradually be raised to the fluxing point of the vinyl chloride polymer resin, and desirably the mix should take place with increasing temperature of the plastic material for a period of up to six to ten minutes but desirably not extending twenty to thirty minutes.

The vinyl chloride polymer resin and pigment material should desirably be in thin sheet form at the termination of the mixing operation with the form of a sheet of about 40 mils in thickness which may then be pulverized to 10 to 40 mesh.

In this manner, the pigment will be protected against discoloration, agglomeration, and will not be subject to change in color, intensity or distribution when subsequently utilized in molding machines or in sheet calenders.

Inorganic pigments which may be used are pigments such as carbon black; titanium dioxide white; cadmium selenide red, yellow or orange; chrome green, yellow or orange; lead molybdate orange; and iron oxide brown, yellow, red or black.

These pigments with the pigments in a mesh size of 40 to 100 mesh per inch and the vinyl polymer in the size of about 10 to 30 mesh are then added together with a two roll mill with one roll being cold and the other roll hot and with a 20° difference in temperature being maintained.

Desirably, a temperature should be maintained ranging from 180° to 350° F. to cause an incipient fusion of the vinyl chloride polymer with a pressure of 2000 to 6000 pounds per square inch and with the fusion being permitted to continue for about six to ten minutes.

The mixture of vinyl chloride polymer and powdered material is reduced to a very thin layer not over 1/32 to 1/64 of an inch and desirably between 10 to 50 mils and preferably about 40 mils in thickness.

The mixture should be caused to deposit and stick to the hot roll in the form of this thin layer from which it is then stripped in hot condition and then broken up to form a particle size of 10 to 40 mesh.

Under these conditions, the chlorine of the vinyl chloride polymer will not attack the pigment nor cause its discoloration.

DESCRIPTION OF PREFERRED EMBODIMENT

As a specific example the following combination may be used:

| Ingredient | Range | Preferred |
| --- | --- | --- |
| Pigment | 55-75 | 65 |
| Dioctylphthalate | 2-6 | 3.5 |
| Castor oil | 2-6 | 3.5 |
| Stabilizer | 5-15 | 10 |
| Vinyl chloride polymer | 20-40 | 27 |

The above are all in parts by weight.

The pigments may vary from 30% of carbon black to 60% of molybdate orange, cadmium red or yellow, chrome yellow or titanium dioxide.

Normally the vinyl chloride polymer having a molecular weight of about 20,000 and subdivided to 100 mesh is preheated to 120° F. and then it is thoroughly mixed with a barium cadmium stabilizer in the amount of 1 to 3 parts for each 100 parts of the vinyl polymer. Then from 0 to 30 parts per 100 of dioctylphthalate is added to get a durometer of about 35 to 60 and desirably of 45 to 50. Finally, the pigments, such as chrome yellow, are added in the amount of 20 to 70%.

The vinyl chloride polymer should be of a expanding type or foaming type which will expand from 3 to 5 times its size, forming pores which will take up the finely divided pigments and other ingredients. This blending or mixing may continue for 10 to 20 minutes at about 110 to 130° F. and desirably 120° F. Then, the mixture is placed in a 2 roll mil with varying speed rollers with one roller moving from 50% to 100% faster than the other roller at an increased temperature of 190 to 220° F. and for a time interval of 15 to 30 minutes until a film is obtained which is about 1/16" to 1/4" thick and desirably about 1/8" thick. Then, a chopper is used followed by a micro pulverizer, the pulverizing taking place at a temperature of −30 to −80° F. and desirably −60° F. The final mesh size of the particles should be less than .05 and desirably less than .03 and at least 50% should pass a 30 mesh screen. This pigmenting mixture, then, can be mixed with a lower vinyl chloride polymer to give a thorough pigmentation thereof in amounts ranging from 10 to 30%. A temperature of 250-275° F. should be used for mixing with assurance that there will be no streaking or clumping or discloration. The fineness of division, together with the presence of dioctylphthalate will assure a thorough mixture of the pigment throughout the vinyl material.

This vinyl polymer bonded pigment may be used in injection molding machines, in calenders and in extrusion machines. It has been found that the pigment is protected against discoloration and change in particle size or color effect and its sticking is eliminated. The pigment will uniformly disperse itself throughout the molding or sheeting mixture without tending to agglomerate in relatively hot or cold spots in the molding mixture.

The vinyl chloride pigment is readily proportioned to the sheeting or molding mixture and its distribution is uniform which cannot be readily accomplished in connection with a dry powdered pigment itself. Together with 1 to 4 parts by weight of vinyl chloride or vinylidene chloride polymer or copolymers with vinyl acetate, it is possible to use 2 to 3 parts by weight of polybutylene or polyethylene polymer, and their coating in the molded sheet or plastic will disperse or merge into the body of the vinyl material without contact between the individual pigment particles.

With a dry pigment on the other hand under comparative conditions, it is found that the pigment particles will be in contact with each other and clumps of them will be dispersed through the plastic composition with the pigment particles agglomerating and contacting one another in different grouping, different size and weight.

Furthermore, it is found that the pigment particles as a result of their range of resin coating in the plastic composition, tend to more uniformly disperse themselves with the various particles due to electrostatic effect being more or less uniformly dispersed and separated in the plastic composition.

Apparently the uniformity is obtained by the pressure and squeezing action which orients the pigment and the relatively high temperature which presses the pigment particles away from one another at the contact between the hot and cold rollers.

It is this subsequent action which results in thorough dispersion of the pigment which each particle being coated by vinyl polymer.

It has been found that by control of the polymerization so that the polymerization of the vinyl chloride in the encapsulated particles is greater than that of the polymerization of the film there will be a tendency of evenness of color without any tendency of any free chlorine released by the vinyl chloride polymer because of the deterioration of the color value of the pigment. This is particularly true of the foamed or expanded vinyl chloride polymer which is utilized as a carrier or coating agent for the particles of the pigment.

Although the procedures of the present application are particularly adapted to inorganic pigments, such as carbon black and various titanium, cadmium, chromium, lead and iron compounds, it has been found that the process of the present invention will also protect organic pigments, such as phthalocyanine blue, green, violet or red; naphthol reds and ultramarine blue from discoloration. The important feature to enhance the polymerization of the encapsulated pigment coating and to prevent further action of free chlorine consists in using a pressure of 400 pounds per square inch when the pigment is incorporated with the polymer and using a temperature of 180° F. to 220° F.

The resultant product before pulverization should have a durometer rating of 35 to 60 and desirably 45 to 50 and the process should take from 10 to 30 minutes. The vinyl resin should be a foam resin and after the sheeting has been formed it should first be chopped into fine particles and then micro pulverized at below freezing and desirably between 0 and −60° F. The micro pulverizing should produce a very fine powdered material which will pass through a 30 mesh and desirably through a 100 mesh screen.

Although ranges of 180 to 350° F. may be employed with pressures ranging from 2000 to 6000 pounds per square inch, with a gradually increasing temperature for a period of 10 to 30 minutes, it has been found that the best values are obtained at about 4000 pounds per square inch at a temperature of about 200 to 250° F. and a period of 15 to 20 minutes with a below freezing pulverizing to reduce the fineness to below 40 mesh and desirably below 100 mesh.

To test the efficacy of the present procedure different batches of the encapsulated pigments were prepared involving a bronze powder and an encircling coating of the poly vinyl chloride polymer. All batches contained a finely divided bronze pigment in an amount of 65% by weight of pigment and 35% by weight of a vinyl chloride polymer. Batch A was processed at 500 pounds pressure at a temperature of 150° F. Batch B was processed at 4000 pounds pressure at a temperature of 220° F. Batch C was processed at 7000 pounds at a temperature of 500° F. These batches were then added for coloration purposes to thin sheet vinyl film in equal proportions. It was found that batches A and C resulted in streaking with discoloration and loss of color value whereas batch B gave an exceptionally well dispersed color and true color value. Other batches were prepared with pressures below 2000 or above 6000 with the other values remaining the same and here, too, the results were found to be unsatisfactory.

Having now particularly described and ascertained the nature of the invention, and in what manner the same is to be performed, what is claimed is:

1. A method of pigmenting vinyl chloride polymer films so as to assure that such pigment shall not be disadvantageously affected in color value by chlorine liberated from the vinyl chloride polymer and said colors being selected from the group consisting of metal powder, phthalocyanine blue, green, violet and red, and chrome green, yellow and orange, and iron oxide brown, yellow, red and black, which comprises first combining together 55 to 75 parts by weight of the pigment, 2 to 6 parts by weight of dioctyl phthalate, 2 to 6 parts by weight of castor oil, and 20 to 40 parts by weight of vinyl chloride polymer, said pigments having a mesh size of 40 to 100 mesh per inch and said vinyl polymer having a mesh size of 10 to 30 mesh per inch and said vinyl chloride polymer being of the expanding and foaming type which comprises mixing for 10 to 20 minutes at about 110 to 130° F., followed by placing the mixture in a 2 roll mill with varying speed rollers and with one roller moving 50 to 100% faster than the other roller at an increasing temperature of 190 to 220° F. for a period of about 15 to 30 minutes, said mixture being heated to an incipient fusion point of 180 to 350° F. at a pressure of about 2,000 to 6,000 pounds per square inch with the fusion being permitted to continue for about 6 to 10 minutes with the mixture being reduced to a very thin layer between the rollers not over $\frac{1}{32}$ to $\frac{1}{64}$ inch in thickness and desirably between 10 to 50 mils in thickness, then chopping and micropulverizing at a temperature of 30 to 80° F. until the final mesh of the particles is less than .05 inch in size, and then incorporating this mixture in a vinyl chloride polymer film.

2. The method of claim 1, said vinyl chloride polymer having a much higher molecular size in connection with the pigmented particles than in the film itself.

3. The method of claim 1, said particles, before incorporation with the vinyl polymer film, having a molecular size of 5,000 to 50,000.

4. The method of claim 1, said rolls having a 20° difference in temperature.

5. The method of claim 1, in which the pigment is used in about 65 parts by weight, the dioctyl phthalate is used in 3.5 parts by weight, the castor oil is used in 3.5 parts by weight, a barium cadmium stabilizer included in the amount of 1 to 3 parts by weight for each 100 parts by weight of the vinyl polymer and the vinyl chloride polymer is used in 27 parts by weight.

6. The method of claim 1, 2 to 3 parts by weight of a polybutylene being used for each 1 to 4 parts by weight of vinyl chloride polymer.

References Cited

UNITED STATES PATENTS

| | | |
|---|---|---|
| 2,987,496 | 6/1961 | Simpson. |
| 3,017,714 | 1/1962 | Slosberg _____ 117—100 |
| 3,085,989 | 4/1963 | Jordan. |
| 3,326,827 | 6/1967 | Mullin _____ 106—308 |

JULIUS FROME, Primary Examiner

L. GARRETT, Assistant Examiner

U.S. Cl. X.R.

260—2.5, 41